(12) United States Patent
Matsumoto et al.

(10) Patent No.: US 8,728,917 B2
(45) Date of Patent: May 20, 2014

(54) CARBON NANOTUBE FORMING METHOD AND PRE-TREATMENT METHOD THEREFOR

(75) Inventors: Takashi Matsumoto, Nirasaki (JP); Osayuki Akiyama, Nirasaki (JP); Kenjiro Koizumi, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 8 days.

(21) Appl. No.: 13/403,346

(22) Filed: Feb. 23, 2012

(65) Prior Publication Data
US 2012/0220106 A1    Aug. 30, 2012

(30) Foreign Application Priority Data
Feb. 25, 2011  (JP) ................. 2011-039489

(51) Int. Cl.
*H01L 21/20* (2006.01)
*H01L 21/36* (2006.01)

(52) U.S. Cl.
USPC 438/478; 438/479; 257/E21.09; 257/E21.347; 977/842

(58) Field of Classification Search
USPC ............. 438/478–509; 257/E21.09, E21.347; 977/842
See application file for complete search history.

(56) References Cited

U.S. PATENT DOCUMENTS

2008/0095695 A1    4/2008 Shanov et al.

FOREIGN PATENT DOCUMENTS

| CN | 101952036 A | | 1/2011 |
|---|---|---|---|
| JP | 2007-252970 | | 10/2007 |
| JP | 2007-261867 | | 10/2007 |
| JP | 2007252970 A | * | 10/2007 |
| JP | 2007261867 A | * | 10/2007 |
| KR | 10-0966353 B1 | | 6/2010 |

* cited by examiner

*Primary Examiner* — Charles Garber
*Assistant Examiner* — Abdulfattah Mustapha
(74) *Attorney, Agent, or Firm* — Rothwell, Figg, Ernst & Manbeck, P.C.

(57) ABSTRACT

A carbon nanotube forming method including providing a target substrate to be processed, a catalytic metal layer being formed on a surface of the target substrate; producing catalytic fine metal particles whose surfaces are oxidized by action of an oxygen plasma on the catalytic metal layer at a temperature $T_1$; and activating the oxidized surfaces of the catalytic fine metal particles by reducing the oxidized surfaces of the catalytic fine metal particles by action of a hydrogen plasma on the catalytic fine metal particles at a temperature $T_2$ higher than the temperature $T_1$. The method further includes growing a carbon nanotube on the activated catalytic fine metal particles by thermal CVD at a temperature $T_3$.

24 Claims, 11 Drawing Sheets

US 8,728,917 B2

CARBON NANOTUBE FORMING METHOD AND PRE-TREATMENT METHOD THEREFOR

CROSS-REFERENCE TO RELATED APPLICATIONS

This application claims priority to Japanese Patent Application No. 2011-039489 filed on Feb. 25, 2011, the entire contents of which are incorporated herein by reference.

FIELD OF THE INVENTION

The present invention relates to a carbon nanotube forming method and a pre-treatment method therefor.

BACKGROUND OF THE INVENTION

A carbon nanotube is a strong candidate for a wiring material to be used in a next-generation semiconductor device which can replace a currently employed Cu wiring due to its good electric conductivity (low electric resistance), good thermal conductivity (high heat dissipation) and high current density resistance (high electromigration resistance). To that end, the carbon nanotube is required to have a specific long length and specific orientation. For example, when a carbon nanotube is employed as a via wiring, the carbon nanotube has to be arranged perpendicularly to a substrate surface in high density.

As a carbon nanotube growing method, a plasma CVD may be employed, wherein hydrocarbon molecules and the like in a source material are excited/decomposed by using a high-energy source such as plasma, and active species thereof and catalytic metal react with each other to thereby grow carbon nanotubes. For example, Japanese Patent Application Publication No. 2007-252970 (JP2007-252970A) discloses a plasma CVD as the carbon nanotube growing method, wherein a catalyst layer made of a transition metal such as Ni, Fe or Co is formed on a substrate, and a carbon nanotube film is formed on the catalyst layer at a processing temperature of 600° C. by employing the plasma CVD using a carbon containing gas and a hydrogen gas. JP2007-252970A describes that, when a catalytic metal is provided in the form of fine particles, radicals in a plasma generated by using the carbon containing gas and the hydrogen gas are applied to the surfaces of the fine particles of the catalytic metal to thereby activate the surfaces of the fine particles in order to prevent deterioration of the catalyst activity due to oxidation of the surfaces of the fine particles.

In the meantime, a thermal CVD is also well known as one of the carbon nanotube growing methods, wherein hydrocarbon molecules of a source material are thermally decomposed on the surface of a catalytic metal to grow the carbon nanotube. For example, Japanese Patent Application Publication No. 2007-261867 (JP2007-261867A) discloses a thermal CVD as the carbon nanotube growing method, wherein a carbon nanotube film is formed on a substrate on which fine particles serving as a catalyst are formed at a temperature in a range between 800 and 1000° C. by the thermal CVD by using a hydrocarbon-based gas as a source material. JP2007-261867A describes that a segmentation process wherein a catalytic metal (e.g., Fe) thin film formed on a substrate is converted into catalytic metal particles by being heated to a temperature in the range between 800 and 1000° C. under an oxygen atmosphere (e.g., atmospheric state) to be dissolved and then cooled; and a re-segmentation process wherein the catalytic metal particles are converted into catalytic fine metal particles by being heated at a temperature in the range between 800 and 1000° C. under an oxygen atmosphere (e.g., atmospheric state).

In the thermal CVD disclosed in JP2007-261867A, it is required to heat the substrate on which a catalytic metal is formed to a high temperature that is equal to or higher than 800° C. This may cause diffusion of impurities and/or increase in thermal budget, which makes it difficult to apply the thermal CVD to the process of manufacturing semiconductor devices.

In the plasma CVD disclosed in JP2007-252970A, the carbon nanotube can be formed at a heating temperature that is lower than that required for the thermal CVD. Since, however, it is necessary to heat the substrate to a temperature of about 600° C. in the plasma CVD, an adequate heat resistance is required for the substrate and/or a material film formed on the substrate. This makes it difficult to apply the plasma CVD to a plastic substrate, for example.

SUMMARY OF THE INVENTION

In view of the above, the present invention provides a carbon nanotube forming method and a pre-treatment method therefor, wherein a carbon nanotube is formed at a considerably low temperature while being substantially perpendicularly oriented with respect to a substrate surface.

In accordance with an aspect of the present invention, there is provided a carbon nanotube forming method including providing a target substrate to be processed, a catalytic metal layer being formed on a surface of the target substrate; producing catalytic fine metal particles whose surfaces are oxidized by action of an oxygen plasma on the catalytic metal layer at a temperature $T_1$; activating the oxidized surfaces of the catalytic fine metal particles by reducing the oxidized surfaces of the catalytic fine metal particles by action of a hydrogen plasma on the catalytic fine metal particles at a temperature $T_2$ higher than the temperature $T_1$; and growing a carbon nanotube on the activated catalytic fine metal particles by the thermal CVD at a temperature $T_3$.

In accordance with another aspect of the present invention, there is provided a pre-treatment method to be carried out before a carbon nanotube is grown on catalytic fine metal particles formed on a target substrate. The method includes providing a target substrate to be processed, a catalytic metal layer being formed on a surface of the target substrate; producing catalytic fine metal particles whose surfaces are oxidized by action of an oxygen plasma on the catalytic metal layer at a temperature $T_1$; and activating the oxidized surfaces of the catalytic fine metal particles by reducing the oxidized surfaces of the catalytic fine metal particles by action of a hydrogen plasma on the catalytic fine metal particles at a temperature $T_2$ higher than the temperature $T_1$.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

An embodiment of the present invention will now be described with reference to the accompanying drawings which form a part hereof.

<Film Forming Apparatus>

Figure 1:
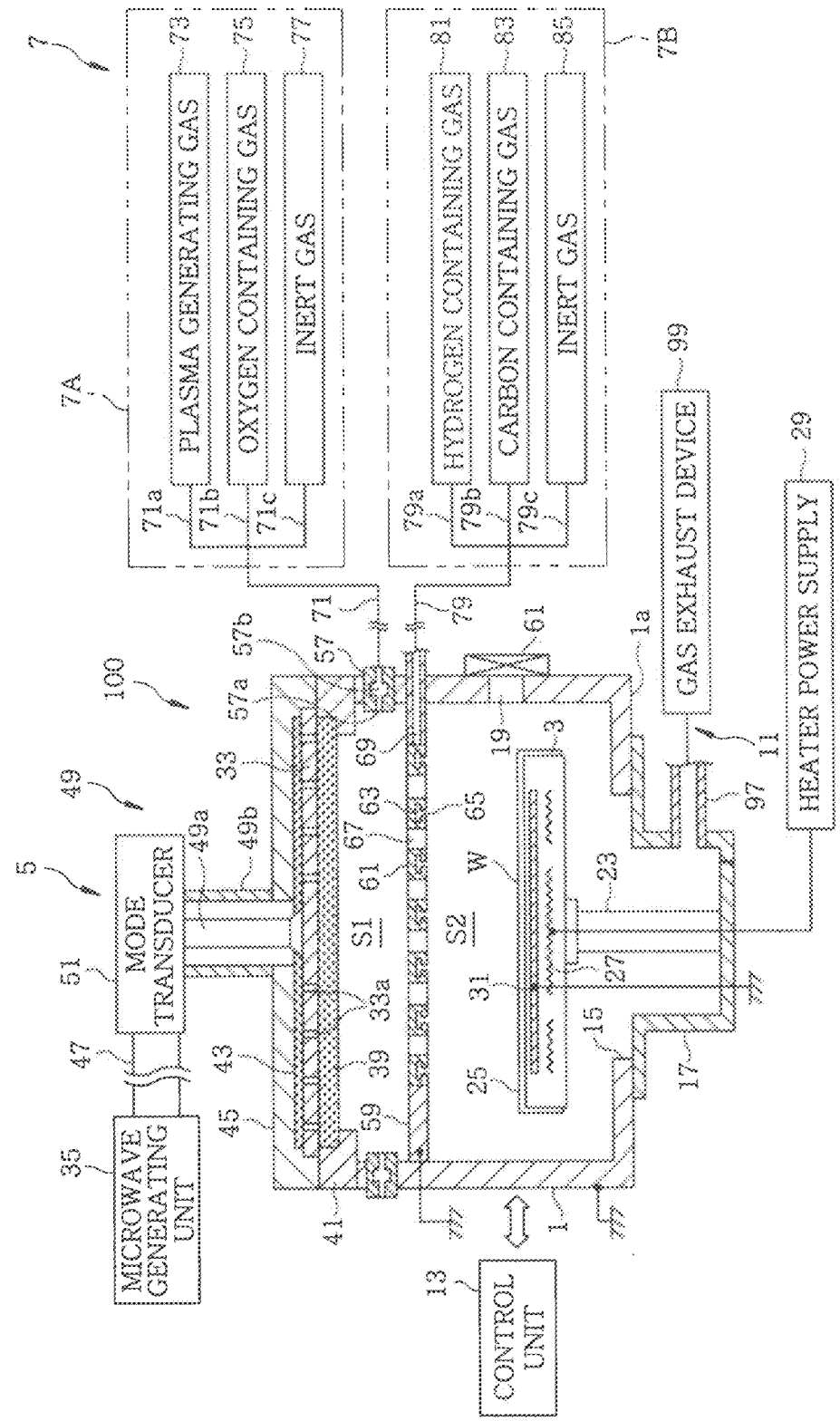
FIG. 1 is a cross sectional view schematically showing a configuration of a carbon nanotube film forming apparatus in accordance with an embodiment of the present invention.
Figure 2:
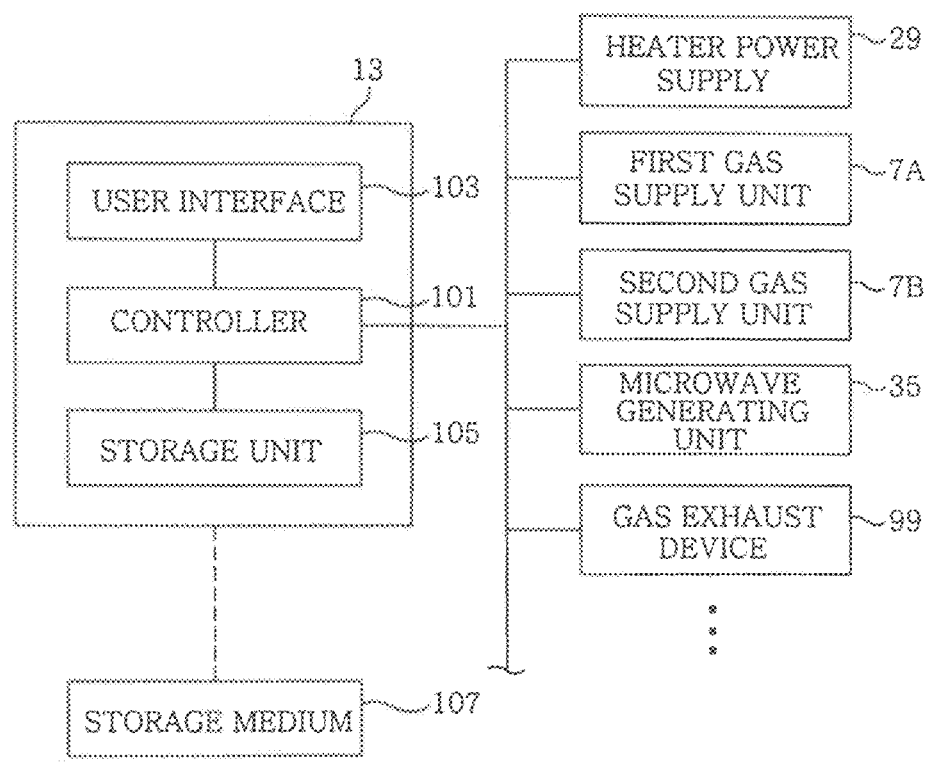
FIG. 2 shows a configuration of a control unit of the film forming apparatus shown in FIG. 1.

FIG. 1 is a cross sectional view schematically showing an example of a film forming apparatus 100 in which a carbon nanotube forming method can be executed. As shown in FIG. 1, the film forming apparatus 100 includes an RLSA (radial line slot antenna) microwave plasma processing apparatus capable of generating a uniform microwave plasma in a processing chamber by radiating microwaves through a plurality of radiation holes in a planar antenna. Since the microwave plasma is a low electron temperature plasma having mainly radicals, it is adequate to be employed in a hydrogen plasma treatment or an oxygen plasma treatment serving as a pre-treatment for a process for forming a carbon nanotube. Moreover, the film forming apparatus 100 can be used as a thermal CVD apparatus for forming a carbon nanotube by using a thermal CVD.

The film forming apparatus 100 mainly includes a substantially cylindrical processing chamber 1; a stage 3 provided in the processing chamber 1 to mount thereon a semiconductor wafer (simply referred to as "wafer" hereinafter) W serving as a target substrate to be processed; a microwave introducing unit 5 for introducing a microwave into the processing chamber 1; a gas supply unit 7 for supplying a gas into the processing chamber 1; a gas exhaust unit 11 for exhausting the processing chamber 1; and a control unit 13 for controlling various units of the film forming apparatus 100.

(Processing Chamber)

A circular opening 15 is formed at a substantially central portion of a bottom wall 1a of the processing chamber 1. Provided in the bottom wall 1a is a gas exhaust room 17 that is downwardly protruded and communicates with the opening 15. Moreover, a loading/unloading port 19 for loading and unloading the wafer W and a gate valve G1 for opening and closing the loading/unloading port 19 are provided in a side wall of the processing chamber 1.

(Stage)

The stage 3, which is made of a ceramic, e.g., AlN, is supported by a cylindrical ceramic supporting member 23 extended upwardly from a central portion of the bottom of the gas exhaust room 17. A guide ring 25 for guiding the wafer W is provided at an outer peripheral portion of the stage 3. Besides, an elevating pin (not shown) for elevating the wafer W is provided in the stage 3 to be upwardly and downwardly movable with regard to an upper surface of the stage 3.

A resistance heater 27 is buried in the stage 3 to heat the wafer W on the stage 3 by a power supplied from a heater power supply 29 thereto. Further, a thermocouple (not shown) is inserted into the stage 3 such that the heating temperature of the wafer W can be controlled to be in a range between 50 and 650° C. Unless otherwise defined, the temperature of the wafer W is given by the temperature measured by the thermocouple, not by the setting temperature of the heater 27. Further, an electrode 31 whose size is similar to that of the wafer W is buried above the heater 27 in the stage 3. This electrode 31 is grounded.

(Microwave Introducing Unit)

The microwave introducing unit 5 is provided above the processing chamber 1 and includes a planar antenna 33 having a plurality of microwave radiation holes 33a; a microwave generating unit 35 for generating a microwave; a transmitting plate 39 made of a dielectric material; a frame shaped member 41 provided above the processing chamber 1; a retardation plate 43 for adjusting a wavelength of the microwave, the retardation plate 43 being made of a dielectric material; and a covering member 45 for covering the planar antenna 33 and the retardation plate 43. The microwave introducing unit 5 further includes a waveguide 47 and a coaxial waveguide 49 through which a microwave generated by the microwave generating unit 35 is transmitted to the planar antenna 33; and a mode tranducer 51 provided between the waveguide 47 and the coaxial wave 49.

The transmitting plate 39 through which the microwave passes is made of a dielectric material such as a ceramic, e.g., quartz, $Al_2O_3$, AlN or the like. The transmitting plate is supported by the frame shaped member 41. A gap between the transmitting plate 39 and the frame member 41 is airtightly sealed by using a sealing member (not shown) such as an O-ring, so that the inside of the processing chamber 1 is airtightly maintained.

The planar antenna 33 is of a circular plate shape, and has a surface which is made of a plate of a conductive material, such as cooper, aluminum, nickel, and an alloy thereof, coated with gold or silver. The planar antenna 33 is located substantially parallel with an upper surface (for mounting the wafer W thereon) of the stage 3, above the transmitting plate 39 (outside the processing chamber 1). The planar antenna 33 is fixably partially placed on the frame shaped member 41.

The planar antenna 33 includes a plurality of rectangular (slot-shaped) microwave radiation holes 33a through which microwaves are radiated. The microwave radiation holes 33a are formed in a predetermined pattern to extend through the planar antenna 33. In general, two adjacent microwave radiation holes 33a are grouped as one pair in a predetermined shape (e.g., T shape), and the pairs of adjacent microwave radiation holes 33a are arranged in a concentric, spiral or radial shape. The length and/or arrangement distance of the microwave radiation holes 33a is determined depending on the wavelength ($\lambda g$) of the microwave.

The radiation plate 43 having a dielectric constant greater than that of a vacuum is provided on an upper surface of the planar antenna 33. The wavelength of a microwave is lengthened in the vacuum and, thus, the radiation plate 43 serves to control the plasma by shortening the wavelength of the microwave. For example, quartz, polytetrafluoroethylene resin, polyimide resin or the like may be employed as a material of the radiation plate 43.

The covering member 45 is provided to cover the planar antenna 33 and the radiation plate 43. The covering member 45 is made of a metal material, e.g., aluminum or stainless steel. The coaxial waveguide 49 is connected at one end to a central portion of an upper wall (ceiling) of the covering member 45. The coaxial waveguide 49 includes an inner conductor 49a extended upwardly from the center of the planar antenna 33; and an outer conductor 49b provided around the inner conductor 49a. The mode transducer 51 is provided at the other end of the coaxial waveguide 49 and connected to the microwave generating unit 35 through the waveguide 47. The waveguide 47 has a rectangular shape that is extended horizontally, and the mode transducer 51 serves to convert a TE mode into a TEM mode, in which the microwave propagates through the waveguide 47.

(Gas Supply Unit)

The gas supply unit 7 includes a shower ring 57 provided along an inner wall of the processing chamber 1 to serve as a first gas introducing unit; and a shower plate 59 provided to partition a space inside the processing chamber 1 into two spaces, i.e., an upper and a lower space and to serve as a second gas introducing unit.

The shower ring 57 includes gas releasing holes 57a through which a gas is introduced into the space inside the processing chamber 1; and gas channels 57b provided below the shower ring 57 to communicate with the gas releasing holes 57a. The gas channels 57b are connected to a first gas supply unit 7A through a gas supply line 71. The first gas supply unit 7A includes three branch pipes 71a to 71c branched from the gas supply line 71. The branch pipe 71a is connected to a plasma generating gas supply source 73 for supplying a plasma generating gas (e.g., Ar gas), and the branch pipe 71b is connected to an oxygen gas containing gas supply source 75 for supplying an oxygen containing gas (e.g., $O_2$ gas) that is used for an oxygen plasma treatment. The branch pipe 71c is connected to an inert gas supply source 77 for supplying an inert gas (e.g., $N_2$ gas). Each of the branch pipes 71a to 71c has a mass flow controller and/or a valve, which are not shown.

For example, a rare gas may be employed as the plasma generating gas. The rare gas may include, e.g., Ar, Ne, Kr, Xe, He or the like. Preferably, Ar gas may be used to stably generate a plasma. The oxygen containing gas may include, e.g., $O_2$, $H_2O$, $O_3$, $N_2O$ or the like. The inert gas may include, e.g., $N_2$. The inert gas supplied from the inert gas supply source 77 also serves as purge gas and a pressure-adjusting gas, for example.

The shower plate 59 includes a gas distributing member 61 made of, e.g., aluminum and having a grid pattern in its plan view. The gas distributing member 61 includes gas channels 63 formed inside a grid-pattern main body of the gas distributing member 61; and a plurality of gas releasing holes 65 extended from the gas channels 63 and opened toward the stage 3. The grid-pattern gas distributing member 61 has a plurality of through holes 67. Connected to the gas channels 63 of the shower plate 59 is a gas supply channel 69 which reaches the wall of the processing chamber 1. The gas supply channel 69 is connected to a second gas supply unit 7B through a gas supply line 79. The second gas supply unit 7B includes three branch pipes 79a to 79c branched from the gas supply line 79.

The branch pipe 79a is connected to a hydrogen containing gas supply source 81 for supplying a hydrogen containing gas (e.g., $H_2$ gas) that is used for a hydrogen plasma treatment and forming a carbon nanotube. The branch pipe 79b is connected to a carbon containing gas supply source 83 for supplying a carbon containing gas (e.g., ethylene gas ($C_2H_4$)) serving as a material of the carbon nanotube. The branch pipe 79c is connected to an inert gas supply source 85 for supplying an inert gas (e.g., $N_2$ gas). Each of the branch pipes 79a to 79c also has a mass flow controller and/or a valve, which are not shown. The hydrogen containing gas may include, e.g., $H_2$, $NH_3$ or the like. The carbon containing gas may include, e.g., ethylene ($C_2H_4$), methane ($CH_4$), ethane ($C_2H_6$), propane ($C_3H_8$), propylene ($C_3H_6$), acetylene ($C_2H_2$), methanol ($CH_3OH$), ethanol ($C_2H_5OH$) or the like. The inert gas may include, e.g., $N_2$. The inert gas supplied from the inert gas supply source 85 also serves as a purge gas and a pressure-adjusting gas, for example.

(Gas Exhaust Unit)

The gas exhaust unit 11 includes a gas exhaust room 17; and a gas exhaust line 97 having one end connected to a side wall of the gas exhaust room 17; and a gas exhaust device 99 connected to the other end of the gas exhaust line 97. The gas exhaust device 99 includes, e.g., a vacuum pump and/or a pressure control valve, which are not shown.

(Plasma Generation Space/Mixture and Diffusion Space)

The processing chamber 1 of the film forming apparatus 100 includes a space S1 defined between the shower plate 59 and the transmitting plate 39 through which the microwave is introduced. A plasma generating gas is introduced from the shower ring 57 to the space S1. In other words, the space S1 mainly serves as a plasma generation space in which a plasma is generated.

The processing chamber 1 further includes a space S2 defined between the shower plate 59 and the stage 3. The space S2 serves as a mixing space in which a carbon containing gas introduced through the shower plate 59 and the plasma generated at the space S1 are mixed and also serves as a diffusion space in which active species in the plasma are diffused toward the wafer W on the stage 3.

(Control Unit)

The control unit 13 is a module controller for controlling various units of the film forming apparatus 100. The control unit 13 is typically a computer and includes a controller 101 having a CPU; a user interface 103 connected to the controller 101; and a storage unit 105. The controller 101 serves to control various units (e.g., the heater power supply 29, the first and the second gas supply unit 7A and 7B, the microwave generating unit 35, the gas exhaust device 99 and the like) related to process conditions, e.g., temperature, pressure, gas flow rate, microwave output and the like.

The user interface 103 includes a keyboard through which a process manager performs a command input process and the like to manage the film forming apparatus 100; a display for visually displaying an operation state of the film forming apparatus 100; and the like. The storage unit 105 stores therein recipes such as operating condition data or control programs to be used in realizing processes performed by the film forming apparatus 100 under the control of the controller 101. If necessary, the recipes are read out from the storage unit 105 under the instruction from the user interface 103 and executed by the controller 101, thereby controlling the film forming apparatus 100. The control programs and the recipes may be stored in a computer-readable storage medium 107. The storage medium 107 may include, e.g., CD-ROM, a hard disk, a flexible disk, a flash memory or the like. Besides, the recipes may be transmitted from other apparatuses via, e.g., a dedicated line.

Next, a configuration example of a processing system 200 which can be used for the carbon nanotube forming method of the present embodiment will be described with reference to FIG. 3. The processing system 200 shown in FIG. 3 includes a multi-chamber cluster tool having a plurality of (e.g., four in FIG. 3) process modules 100A to 100D.

The processing system 200 mainly includes the four process modules 100A to 100D; a vacuum transfer chamber 203 connected to each of the process modules 100A to 100D via a gate valve G1; two load-lock chambers 205a and 205b connected to the vacuum transfer chamber 203 via their gate valves G2; and a loader unit 207 connected to the transfer chamber 203 via its gate valve G3.

(Process Module)

Each of the process modules 100A to 100D has the same configuration as the film forming apparatus 100 shown in FIG. 1 and is configured to perform an oxygen plasma treatment, a hydrogen plasma treatment and a carbon nanotube forming treatment on the wafer W. Further, each of the process modules 100A to 100D may be configured to perform other treatments on the wafer W. The process modules 100A to 100D respectively include stages 3A to 3D for the wafer W thereon.

(Vacuum Transfer Room)

The evacuable vacuum transfer chamber 203 includes a transfer unit 209 serving as a first substrate transfer unit for transferring the wafer W from and to each of the process modules 100A to 100D and the load-lock chambers 205a and 205b. The transfer unit 209 includes a pair of transfer arm units 211 that are arranged opposite to each other. Each of the transfer arm units 211 is configured to be extensible and rotatable about the same rotation axis. Forks 213, each for mounting and supporting the wafer W thereon, are respectively provided at front ends of the transfer arm units 211.

While mounting the wafer W on one of the forks 213, the transfer unit 209 transfers the wafer W between the process modules 100A to 100D or between one of the process modules 100A to 100D and one of the load-lock chambers 205a and 205b.

Stages 206a and 206b, each for mounting the wafer W thereon, are respectively provided in the load-lock chambers 205a and 205b. Each of the load-lock chambers 205a and 205b serves to switch its inside to a vacuum state or an atmospheric opened state. The wafer W is transferred, via the stage 206a or 206b of the load-lock chamber 205a or 205b, between the vacuum transfer chamber 203 and an atmospheric transfer chamber 219 which will be described later.

(Loader Unit)

The loader unit 207 includes the atmospheric transfer chamber 219 having a transfer unit 217 serving as a second substrate transfer unit for transferring the wafer W; three load ports LP arranged adjacently at one side of the atmospheric transfer chamber 219; and an orienter 221 disposed adjacently at another side of the atmospheric transfer chamber 219 to serve as a positioning device for positioning the wafer W. The orienter 221 includes a rotary plate 233 configured to be rotatable by a driving motor (not shown); and an optical sensor 237 provided at an outer peripheral portion of the rotary plate 233 to monitor a peripheral portion of the wafer W.

(Atmospheric Transfer Chamber)

The atmospheric transfer chamber 219 has a rectangular shape in its plan view and includes a circulation device (not shown) for circulating nitrogen gas or clean air; and a guide rail 223 provided along a longer side thereof. The transfer unit 217 is supported on the guide rail 223 to be slidable. That is, the transfer unit 217 can slide along the guide rail 223 in the X direction by a driving unit (not shown). The transfer unit 217 includes a pair of transfer arm units 225 that are vertically arranged in two, i.e., an upper stage and a lower stage. Each of the transfer arm units 225 is configured to be extensible and rotatable. Forks 227 are respectively provided at front ends of the transfer arm units 225, and each of them serves as a supporting member for mounting and supporting the wafer W thereon. While mounting the wafer W on each of the forks 227, the transfer unit 217 transfers the wafer W between a wafer cassette CR of each of the load ports LP, the respective load-lock chamber 205a and 205b and the orienter 221.

(Load Port)

Each of the load ports LP is configured to mount the corresponding wafer cassette CR thereon. Each of the wafer cassettes CR is configured to accommodate wafers W therein by mounting the wafers W in multiple stages one on top of another at a same interval.

(Integrated Controller)

Various units of the processing system 200 are connected to and controlled by the integrated controller 250. In addition to controlling, e.g., the load-lock chambers 205a and 205b and the transfer units 209 and 217, the integrated controller 250 integratedly manages the control unit 13 for individually controlling each of the process modules 100A and 100D.

<Carbon Nanotube Forming Method>

Figure 4:
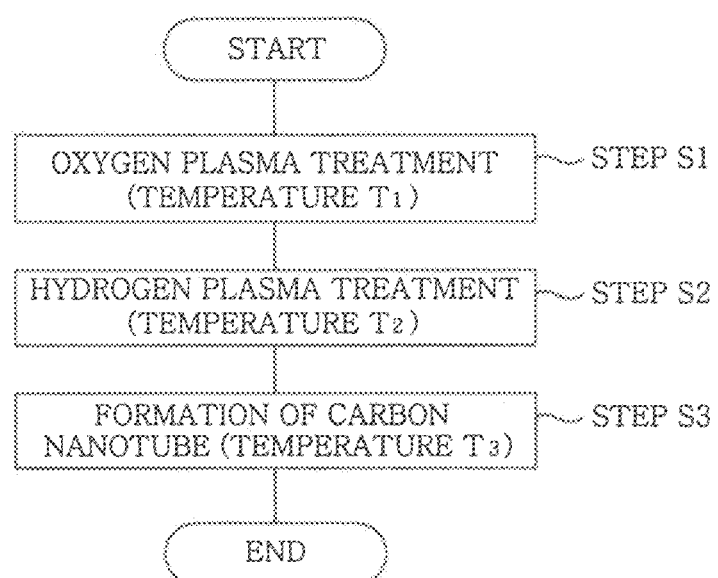
FIG. 4 is a flow chart showing a method for forming a carbon nanotube in accordance with another embodiment of the present invention.

Next, there will be described a carbon nanotube forming method that can be executed in the film forming apparatus 100. FIG. 4 is a flow chart for explaining a sequence of the carbon nanotube forming method in accordance with another embodiment of the present invention. FIGS. 5A to 5D are longitudinal cross sectional views showing a vicinity of the surface of the wafer W for explaining main steps of the carbon nanotube forming method of the present embodiment.

The carbon nanotube forming method of the present embodiment includes an oxygen plasma treatment and a hydrogen plasma treatment to be performed before a carbon nanotube is formed. The oxygen plasma treatment is a process for converting a catalytic metal layer to catalytic fine metal particles as well as oxidizing surfaces of the catalytic fine metal particles to thereby suppress their sizes from being increased beyond a desired level due to the aggregation. The hydrogen plasma treatment is a process for reducing the oxidized surfaces of the catalytic fine metal particles and activating same. In the present embodiment, the oxygen and the hydrogen plasma treatment are collectively referred to as "pre-treatment" of the carbon nanotube forming method. In the flowing description, Ar gas, gas, $H_2$ gas, $N_2$ gas and $C_2H_4$ gas are employed as respective examples of the plasma generating gas, the oxygen containing gas, hydrogen containing gas, the inert gas and the carbon containing gas.

Figure 5A:
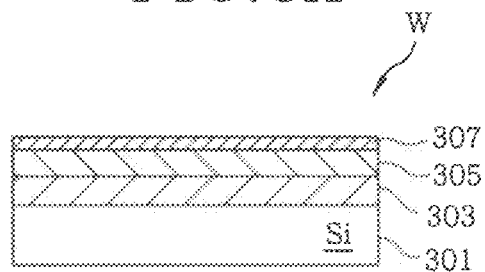
FIG. 5A is a schematic view showing a structure of a wafer including a catalytic metal layer serving as a target substrate to be processed.

The wafer W in which a catalytic metal is formed is first prepared, and the gate valve G1 of the film forming apparatus 100 is opened so that the wafer W is loaded into the processing chamber 1 and mounted onto the stage 3. For example, as shown in FIG. 5A, the wafer W includes a silicon substrate 301; an underlying layer 303 stacked on a surface layer portion of the silicon substrate 301; an underlying layer 305 stacked on the underlying layer 303; and a catalytic metal layer 307 stacked on the underlying layer 305.

Each of the underlying layers 303 and 305 serves as a film for preventing coarsening caused by agglomeration of catalytic metal and is made of, e.g., Al, Ti, $Al_2O_3$, TiN, Ta, TaN, $SiO_2$, or the like. The underlying layers 303 and 305 may be formed by using a well-known technique, e.g., sputtering, depositing, CVD, plating or the like. Each of the underlying layers 303 and 305 preferably has a thickness in a range between 5 and 100 nm. The underlying layers 303 and 305 are not limited to two layers. Instead, a single underlying layer may be used. Alternatively, a layer such as an insulating layer or the like may be disposed below the underlying layers 303 and 305.

The catalytic metal layer 307 is a metal film for forming catalytic fine metal particles serving as cores of growing a carbon nanotube. The catalytic metal layer 307 is made of, e.g., a transition metal such as Fe, Co, Ni, Ru, Au or the like or an alloy including such transition metal. The catalytic metal layer 307 may be formed by using a well-known technique, e.g., sputtering, depositing, CVD, plating or the like. The size of catalytic fine metal particle produced in the oxygen plasma treatment process (step S1) is affected by the thickness of the catalytic metal layer 307 and, thus, the catalytic metal layer 307 preferably has a thickness in the range between 0.1 and 5 nm.

For example, a glass substrate, a plastic (high polymer) substrate or the like may be employed instead of the wafer W serving as a semiconductor substrate.

(Step S1: Oxygen Plasma Treatment)

Figure 5B:
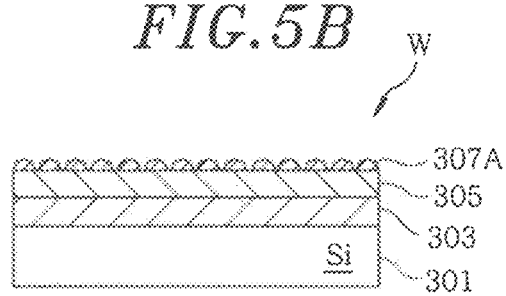
FIG. 5B is a schematic view showing a state of the wafer in which the catalytic metal layer is converted to catalytic fine metal particles by an oxygen plasma treatment.

In step S1, the oxygen plasma treatment is performed on the catalytic metal layer 307 while the wafer W mounted on the stage 3 is heated. This treatment is a process for producing catalytic fine metal particles 307A as shown in FIG. 5B by converting the catalytic metal layer 307 into fine metal particles by using the action of an oxygen plasma. Specifically, in the oxygen plasma treatment, impurities such as organic matters and the like attached on a metallic surface of the catalytic metal layer 307 are removed by the oxygen plasma so that metallic atoms can easily move. As a result, the migration occurs on the surface of the catalytic metal layer 307 due to heating and adequate agglomeration occurs in the metal of the catalytic metal layer 307, so that the catalytic metal layer 307 is converted into fine metal particles.

As such, in the oxygen plasma treatment, an energy that is just enough to move atoms of the metallic surface is supplied to the catalytic metal layer 307, so that the metallic surface is changed into an island shape in which some metallic atoms are gathered together (this is referred to as "agglomeration"). At this time, the surfaces of the thus-produced catalytic fine metal particles 307A are oxidized by the oxygen plasma and the size increase in the catalytic fine metal particle 307A caused by excessive agglomeration is suppressed to thereby control the particle size.

The catalytic fine metal particles 307A produced in step S1 preferably have the sizes in the range between 1 and 50 nm, for example. Moreover, thinner initial film thickness of the catalytic metal layer 307 causes the size of the island shape to be decreased and the diameters of the catalytic fine metal particles 307A to be reduced. For example, when the film thickness of the catalytic metal layer 307 is 1 nm, the catalytic fine metal particles 307A have the diameters of about 10 nm. When the film thickness of the catalytic metal layer 307 is 2 nm, the catalytic fine metal particles 307A have the diameters of about 20 nm.

In step S1, while Ar gas and $O_2$ gas are introduced into the processing chamber 1 through the shower ring 57, a microwave generated in the microwave generating unit 35 is transferred to the planar antenna 33 in a predetermined mode through the waveguide 47 and the coaxial wave guide 49 and then introduced into the processing chamber 1 through the microwave radiation holes 33a of the planar antenna 33 and the transmitting plate 39. By the microwave, the Ar gas and the $O_2$ gas are respectively converted into plasmas and, thus, the oxygen plasma treatment is performed on the catalytic metal layer 307 formed on the surface of the wafer W to thereby convert it into the catalytic fine metal particles 307A.

A temperature $T_1$ in the oxygen plasma treatment is set at a temperature in the range between, e.g., 100 and 450° C. preferably, or between 250 and 350° C. more preferably, as the temperature of the wafer W. When the temperature $T_1$ is lower than 100° C., it is difficult to completely convert the catalytic metal layer 307 into fine particles. When the temperature $T_1$ is higher than 450° C., the agglomeration of the catalytic fine metal particles 307A is proceeded, which increases the sizes of the catalytic fine metal particles 307A.

The pressure in the processing chamber 1 is set to be in the range between, e.g., 66.7 and 400 Pa (0.5 and 3 Torr) preferably, or between 133 and 266 Pa more preferably, in order to generate many radicals in the oxygen plasma.

The flow rate of $O_2$ gas is set to be in the range between, e.g., 50 and 500 mL/min (sccm) preferably, or between 100 and 200 mL/min (sccm) more preferably, in order to suppress excessive oxidization of the catalytic fine metal particles 307A.

The flow rate of Ar gas is set to be in the range between, e.g., 100 and 2000 mL/min (sccm) preferably, and between 300 and 1000 mL/min (sccm) more preferably, in order to enhance generating efficiency of active species in the plasma.

The power of microwave is set to be in the range, e.g., between 500 and 4000 W preferably, and between 500 and 1500 W more preferably, in order to both generate active species effectively in the plasma and form the carbon nanotube at a low temperature.

The processing time is set to be in the range between, e.g., 1 and 20 minutes preferably, and between 5 and 10 minutes more preferably, in order to optimize the conversion of the catalytic metal layer 307 into the catalytic fine metal particles 307A.

When the oxygen plasma treatment of step S1 is ended, the supply of the microwave is first stopped and then the supply of $O_2$ gas is stopped. Further, $H_2O$ gas, $O_3$ gas, $N_2O$ gas or the like may be employed in the oxygen plasma treatment instead of $O_2$ gas.

(Step S2: Hydrogen Plasma Treatment)

Figure 5C:
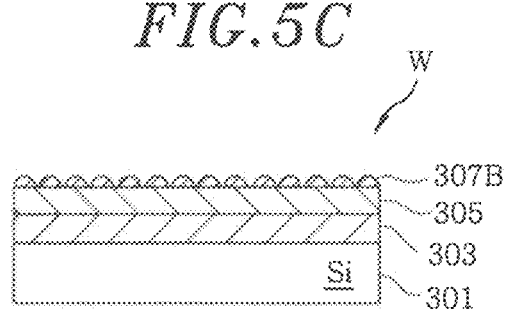
FIG. 5C is a schematic view showing a state of the wafer in which the catalytic fine metal particles are activated by a hydrogen plasma treatment.

Next, the hydrogen plasma treatment is carried out in step S2. The hydrogen plasma treatment is a treatment that is carried out after step S1 to activate the catalytic fine metal particles 307A by reducing by the hydrogen plasma the surfaces of the catalytic fine metal particles 307A which are produced in the oxygen plasma treatment of step S1 (activating treatment). In FIG. 5C, the reference numeral "307B" indicates the activated catalytic fine metal particles after the hydrogen plasma treatment. By performing the hydrogen plasma treatment, it is possible to maintain the activated catalytic fine metal particles in the state of fine particles and in high density.

After the oxygen plasma treatment of step S1 is ended, in step S2, the microwave is transferred from the microwave generating unit 35 to the planar antenna 33 through the waveguide 47 and the coaxial wave guide 49 and introduced into the processing chamber 1 through the transmitting plate 39 while Ar gas is supplied. The Ar gas is converted into an Ar plasma. When the Ar plasma is ignited, $H_2$ gas is introduced into the processing chamber 1 through the shower plate 59 and converted into an $H_2$ plasma by the Ar plasma. The hydrogen plasma treatment is carried out on the surfaces of the catalytic fine metal particles 307A by using such microwave plasma, so that oxide films (not shown) formed on the surfaces of the catalytic fine metal particles 307A are reduced into the activated catalytic fine metal particles 307B.

A temperature $T_2$ in the hydrogen plasma treatment is set to be in the range between, e.g., 100 and 550° C. preferably, or 250 and 550° C. more preferably, as the temperature of the wafer W in order to promote activation of the catalytic fine metal particles 307A and prevent size increase in the catalytic fine metal particles 307A. When the temperature $T_2$ is lower than 100° C., it is difficult to sufficiently reduce the oxide films formed on the surfaces of the catalytic fine metal particles 307A, causing an incomplete activation. When the temperature $T_2$ is higher than 550° C., the agglomeration of the activated catalytic fine metal particles 307B may proceed, thereby increasing the sizes of the activated catalytic fine metal particles 307B. Further, the temperature $T_2$ in the hydrogen plasma treatment is required to be higher than the temperature $T_1$ in the oxygen plasma treatment (i.e., $T_2>T_1$). This will be described later in detail.

The pressure in the processing chamber 1 is set to be in the range between, e.g., 66.7 and 400 Pa (0.5 and 3 Torr) preferably, or 133 and 266 Pa more preferably, in order to generate many radicals in the hydrogen plasma.

The flow rate of $H_2$ gas is set to be in the range between, e.g., 100 and 2000 mL/min (sccm) preferably, or 100 and 500 mL/min (sccm) more preferably, in order to enhance generating efficiency of active species in the plasma.

The flow rate of Ar gas is set to be in the range between, e.g., 100 and 2000 mL/min (sccm) preferably, or 300 and 1000 mL/min (sccm) more preferably, in order to enhance generating efficiency of active species in the plasma.

The power of microwave is set to be in the range, e.g., 500 and 4000 W preferably, or 500 and 1500 W more preferably, in order to both generate active species effectively in the plasma and produce the carbon nanotube at a low temperature.

The processing time is set to be in the range, e.g., 1 and 20 minutes preferably, or 5 and 10 minutes more preferably, in order to both suppress agglomeration of the catalytic fine metal particles 307A and activate the catalytic fine metal particles 307A in high density.

When the hydrogen plasma treatment of step S2 is ended, the supply of microwave is first stopped and then the supply of $H_2$ gas is stopped. A hydrogen containing gas such as $NH_3$ gas or the like may be employed in the hydrogen plasma treatment instead of $H_2$ gas.

(Step S3: Formation of Carbon Nanotube)

Next, formation of a carbon nanotube 309 is carried out in step S3. Preferably, the formation of the carbon nanotube 309 is continuously carried out following the hydrogen plasma treatment in order to prevent inactivation of the activated catalytic fine metal particles 307B produced in the hydrogen plasma treatment. More preferably, the formation of the carbon nanotube 309 is continuously carried out in the very same processing chamber in which the hydrogen plasma treatment has been carried out. In the film forming apparatus 100, the formation of the carbon nanotube 309 is carried out by using the thermal CVD.

(Thermal CVD)

Figure 5D:
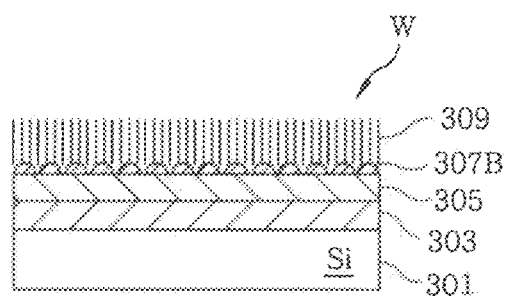
FIG. 5D is a schematic view showing a state of the wafer in which a carbon nanotube is formed.

After the hydrogen plasma treatment of step S2, $C_2H_4$ gas is introduced into the processing chamber 1 through the shower plate 59 by using $N_2$ gas as a carrier gas while Ar gas is supplied. Then, by thermally decomposing the $C_2H_4$ gas in the space S2, the carbon nanotube 309 is formed on the activated catalytic fine metal particles 307B as shown in FIG. 5D.

A temperature $T_3$ in the growing treatment of the carbon nanotube 309 using the thermal CVD is set to be in the range between, e.g., 300 and 550° C. preferably, and 300 and 500° C. more preferably, as the temperature of the wafer W in order to realize the low temperature process. In the present embodiment, it is possible to grow the carbon nanotube 309 at a low temperature 550° C. or lower, preferably between 300 and 500° C. by performing the oxygen plasma treatment of step S1 and the hydrogen plasma treatment as the pre-treatment. This temperature $T_3$ may be equal to or different from the temperature $T_2$ in the hydrogen plasma treatment. When the temperature $T_3$ is equal to the temperature $T_2$ in the hydrogen plasma treatment, it is possible to increase the throughput.

The pressure in the processing chamber 1 is set to be in the range between, e.g., 66.7 and 667 Pa (0.5 and 5 Torr) preferably, or 400 and 667 Pa more preferably, in order to maintain an enough growing speed of the carbon nanotube 309.

The flow rate of $C_2H_4$ gas is set to be in the range between, e.g., 5 and 200 mL/min (sccm) preferably, or 6 and 30 mL/min (sccm) more preferably, in order to efficiently grow the carbon nanotube 309.

Moreover, by introducing Ar gas and $N_2$ gas together with $C_2H_4$ gas into the processing chamber 1, it is possible to increase the growing speed of the carbon nanotube 309 and enhance growing quality. However, it is not imperative to use Ar gas and $N_2$ gas. When Ar gas is introduced, the flow rate of Ar gas is set to be in the range between, e.g., 100 and 2000 mL/min (sccm) preferably, or 300 and 1000 mL/min (sccm) more preferably, in order to effective grow the carbon nanotube 309. When $N_2$ gas is introduced, the flow rate of $N_2$ gas is set to be in the range between, e.g., 100 and 1000 mL/min (sccm) preferably, or 100 and 300 mL/min (sccm) more preferably, in order to effectively grow the carbon nanotube 309.

The processing time is set to be in the range, e.g., 10 and 120 minutes preferably, or 30 and 90 minutes more preferably, in order to prevent catalyst activation from being deteriorated and at the same time grow the carbon nanotube to have an enough length.

In the formation of the carbon nanotube 309 by using the thermal CVD, the present embodiment is not limited to ethylene ($C_2H_4$) gas. For example, the present embodiment may use another type of hydrocarbon gas such as methane ($CH_4$) gas, ethane ($C_2H_6$) gas, propane ($C_3H_8$) gas, propylene ($C_3H_6$) gas, acetylene ($C_2H_2$) gas or the like, or a carbon containing gas such as methanol ($CH_3OH$) gas, ethanol ($C_2H_5OH$) gas or the like. Instead of Ar gas, the present embodiment may employ another type of rare gas such as He gas, Ne gas, Kr gas, Xe gas or the like. In addition, by introducing into the processing chamber 1 the carbon containing gas together with a reducing gas, e.g., $H_2$ gas, $NH_3$ gas or the like, or an oxidizing gas, e.g., $O_2$ gas, $O_3$ gas, $H_2O$ gas, $N_2O$ gas or the like, it is possible to increase the growing speed of the carbon nanotube 309 and enhance growing quality.

By using thermal CVD, the carbon nanotube 309 is grown while maintaining properties of the activated catalytic fine metal particles 307B. Accordingly, by the hydrogen plasma treatment, it is possible to form the high-density carbon nanotube 309 oriented substantially perpendicularly with regard to the surface of the wafer (underlying layer 305) on the activated catalytic fine metal particles 307B which have been activated in high density. In the present embodiment, it is possible to form the carbon nanotube 309 at a temperature 550° C. or lower, which is significantly lower than that in the thermal CVD. Further, the thermal CVD inflicts no damage to electrons and ions in the carbon nanotube 309 to thereby prevent crystal defects and infiltration of impurities, and form the carbon nanotube 309 having less impurities and a high G/D ratio and an adequate crystalline orientation.

After the carbon nanotube 309 is formed by using step S1 to step S3, the supply of the gases is stopped and the pressure in the processing chamber 1 is adjusted. Then, the gate valve G1 is opened and the wafer W is unloaded. Besides, the carbon nanotube forming method of the present embodiment may include an additional step other than step S1 to step S3. For example, the present embodiment may further include a step in which the processing chamber 1 is exhausted at a high speed and is then purged by supplying Ar gas or $N_2$ gas, between step S1 and step S2, and step S2 and step S3.

(Speed of Pre-Treatment)

Next, the relationship between the temperature $T_1$ in the oxygen plasma treatment of step S1 and the temperature $T_2$ in the hydrogen plasma treatment of step S2, which are performed as the pre-treatment will be described. It is possible to suppress agglomeration of the catalytic fine metal particles 307A produced in the conversion of the catalytic metal layer 307 into fine particles by carrying out the oxygen plasma treatment of step S1 at the temperature $T_1$ that is relatively lower than the temperature $T_2$ in the hydrogen plasma treatment of step S2 (i.e., $T_2 > T_1$). In the meantime, by carrying out the hydrogen plasma treatment of step S2 at the temperature $T_2$ that is relatively higher than the temperature $T_1$ in the oxygen plasma treatment of step S1, it is possible to effectively reducing the surfaces of the catalytic fine metal particles 307A and maintain the catalytic fine metal particles 307A in a high activated state. In the present embodiment, it is possible to maximize the effects of the oxygen and the hydrogen plasma treatment by maintaining a difference between the processing temperature of step S1 and that of step S2.

As described above, the temperature $T_1$ and the temperature $T_2$ are respectively set to be in the range between 100 and 450° C. and between 100 and 550° C. However, the difference ($T_2-T_1$) between the temperature $T_2$ and the temperature $T_1$ is set to be 50° C. or higher preferably, or 100° C. or higher more preferably. By setting the difference ($T_2-T_1$) to be 50° C. or higher, it is possible to make clear the boundary between step S1 and step S2 to thereby maximize the effects in the respective treatments. Specifically, by maintaining the difference ($T_2-T_1$) therebetween, it is possible to reliably perform each of the conversion of catalytic metal into fine particles and surface oxidization of the thus-produced catalytic fine metal particles 307A in the oxygen plasma treatment of step S1, and the activation (reduction of oxidized surfaces) of the catalytic fine metal particles 307A in the hydrogen plasma treatment of step S2.

Step S1 and step S2 are preferably carried out in such a way that temperature change in the wafer W is phased from the temperature $T_1$ to the temperature $T_2$. In this specification, the word "phase" indicates a rapid increase of at least 100° C./min or higher (preferably, in the range between 200 and 300° C./min) in temperature of the wafer W, instead of a gradual increase in temperature, when the processing is converted from step S1 to step S2.

A first and a second method will be described as examples for phasing temperature change in the wafer W from the temperature $T_1$ to the temperature $T_2$.

(First Method)

In accordance with the first method, a plurality of stages 3 are used, and the wafer W is transferred in a short time period from a stage 3 configured to heat the wafer W to the temperature $T_1$ to another stage 3 configured to heat the wafer W to the temperature $T_2$. The first method can be carried out preferably in, e.g., the multi-chamber processing system 200 shown in FIG. 3. For example, in the processing system shown in FIG. 3, the oxygen plasma treatment of step S1 is carried out at the temperature $T_1$ at the stage 3A in the process module 100A. After the oxygen plasma treatment of step S1 is ended, the wafer W is transferred to the stage 3B, 3C or 3D in one of the process modules 100B to 100D and the hydrogen plasma treatment of step S2 is carried out at the temperature $T_2$. Here, the temperature of the wafer W heated by the stage 3B, 3C or 3D in the corresponding process module 100B, 100C or 100D to which the wafer W is transferred is set to be the temperature $T_2$. As such, it is possible to realize the phasing the temperature change in the wafer by transferring the wafer W which has been subjected to the oxygen plasma treatment of step S1 at the temperature $T_1$ to a different chamber in which the hydrogen plasma treatment of step S2 is carried out the temperature $T_2$.

Figure 6:
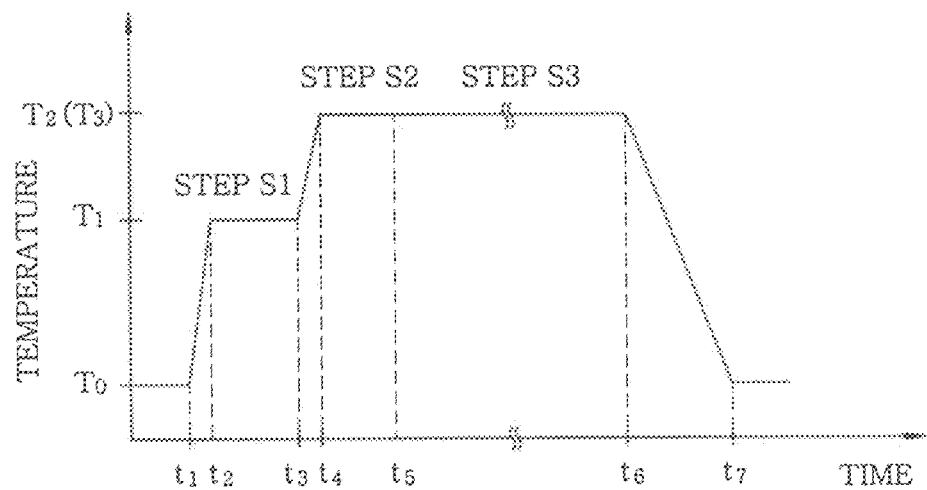
FIG. 6 is a graph showing an example of temperature variation in a wafer when a carbon nanotube is formed thereon.

FIG. 6 shows an example of temperature change in the wafer W in accordance with the first method. First, the wafer W having an initial temperature $T_o$ is mounted onto, e.g., the stage 3A in the process module 100A at a time point $t_1$. The output of the heater power supply 29 for the heater 27 has been adjusted in such a way that the wafer W mounted onto the stage 3A is heated to the temperature $T_1$. During a time period from a time point $t_1$ to a time point $t_2$, the wafer W is heated from the initial temperature $T_0$ to the temperature $T_1$ required for the oxygen plasma treatment of step S1. Then, the oxygen plasma treatment is carried out during the time period from the time point $t_2$, when the wafer W is heated to the temperature $T_1$, to a time point $t_3$.

When the oxygen plasma treatment of step S1 is ended, the wafer W is unloaded from the process module 100A. The wafer W is transferred to, e.g., the stage 3B in the process module 100B by the transfer unit 209. The output of the heater power supply 29 for the heater 27 has been adjusted in such a way that the wafer W mounted onto the stage 3B is heated to the temperature $T_2$. In the meantime, a slight heat loss may occur from the wafer W while the wafer W is transferred from the process module 100A to the process module 100B. However, such heat loss is not shown in FIG. 6 since the heat loss is reduced to a predetermined level that can be left out of consideration by speeding the transfer of the wafer W by the transfer unit 209.

The wafer W mounted on the stage 3B in the process module 100B is rapidly heated to the temperature $T_2$ during a time period from the time point $t_3$ to a time point $t_4$. At this time, a temperature rising rate of the wafer W between the time point $t_3$ and the time point $t_4$ is required to be equal to or greater than at least 100° C./min. Further, it is preferable to shorten the period of time between the time point $t_3$ and the time point $t_4$.

Next, the hydrogen plasma treatment of step S2 is carried out at the temperature $T_2$ during a time period from the time point $t_4$ to a time point $t_5$. When the hydrogen plasma treatment is ended, the formation of the carbon nanotube 309 of step S3 is continuously carried out during a time period from the time point $t_5$ to a time point $t_6$ while the temperature of the wafer W is maintained at the temperature $T_2$ (in this case, it is identical to a temperature $T_3$). Alternatively, the carbon nanotube 309 may be formed at a temperature that is different from the temperature $T_2$. That is, the temperature $T_2$ may be different from the temperature $T_3$.

When the formation of the carbon nanotube 309 is ended at the time point $t_6$, the wafer W is unloaded from the process module 100B by using the transfer unit 209 and is then accommodated into one of the load ports LP through the load-lock chamber 205a or 205b by using transfer unit 217. Thereafter, the temperature of the wafer W is decreased to the initial temperature $T_0$ during a time period from the time point $t_6$ to a time point $t_7$.

(Second Method)

In accordance with the second method for phasing temperature change in the wafer W from the temperature $T_1$ to the temperature $T_2$, a single stage 3 is used and, after the oxygen plasma treatment is performed at the temperature $T_1$, the wafer W is transferred from the stage 3 to a separate place. Then, the stage 3 is heated by adjusting the output of the heater power supply 29 for the heater 27 such that the wafer W mounted on the stage 3 can be heated to the temperature $T_2$ and, then, the wafer W is retuned to the stage 3. In this case, the returned wafer W to the stage 3 is heated to the temperature $T_2$ at the temperature rising rate of 100° C./min or more. Further, while the wafer W is in the separated place between step S1 and Step S2, the temperature of the wafer W may be decreased below the temperature $T_1$.

Specifically, in accordance with the second method, the oxygen plasma treatment of step S1 is carried out at the temperature $T_1$ at, e.g., the stage 3A in the process module 100A. After the oxygen plasma treatment is ended, the wafer W is transferred from the process module 100A to the load-lock chamber 205a or 205b by using the transfer unit 209 to be mounted onto the stage 206a or 206b. Then, while the wafer W is standing by in the load-lock chamber 205a or 205b, the temperature of the stage 3A is increased by supplying a power from the heater power supply 29 to the heater 27. After the temperature of the stage 3A is increased such that the wafer W mounted on the stage 3A can be heated to the temperature $T_2$, the wafer W is returned to the process module 100A by using the transfer unit 209 to be mounted onto the stage 3A.

Figure 3:
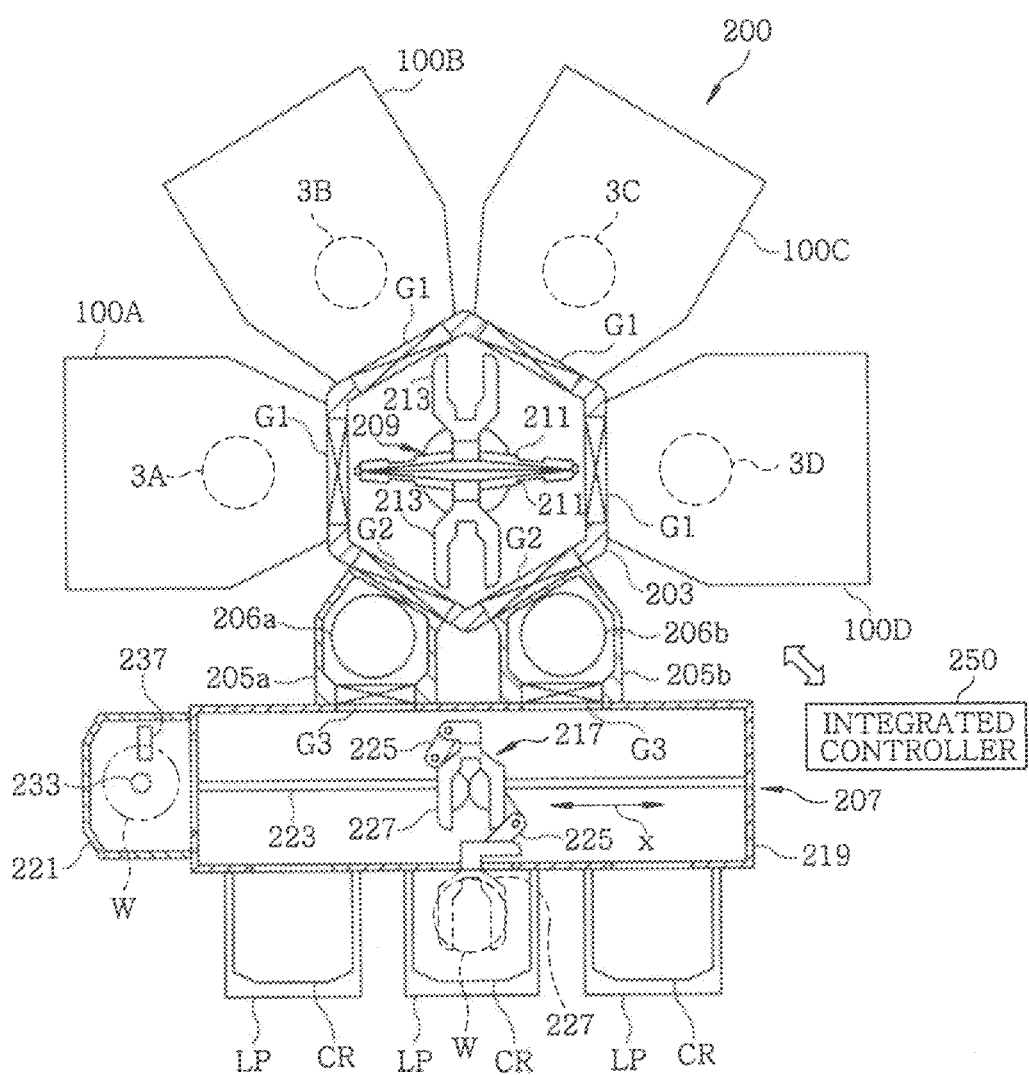
FIG. 3 shows a configuration of a multi-chamber processing system including the film forming apparatus shown in FIG. 1.

As such, the second method is not limited to the multi-chamber processing system 200 shown in FIG. 3 and is applicable to a processing apparatus including a single processing chamber and a load-lock chamber. Further, as the place in which the wafer W stands by, any place may be employed without being limited to the load-lock chamber as long as it can accommodate the wafer W therein.

Figure 7:
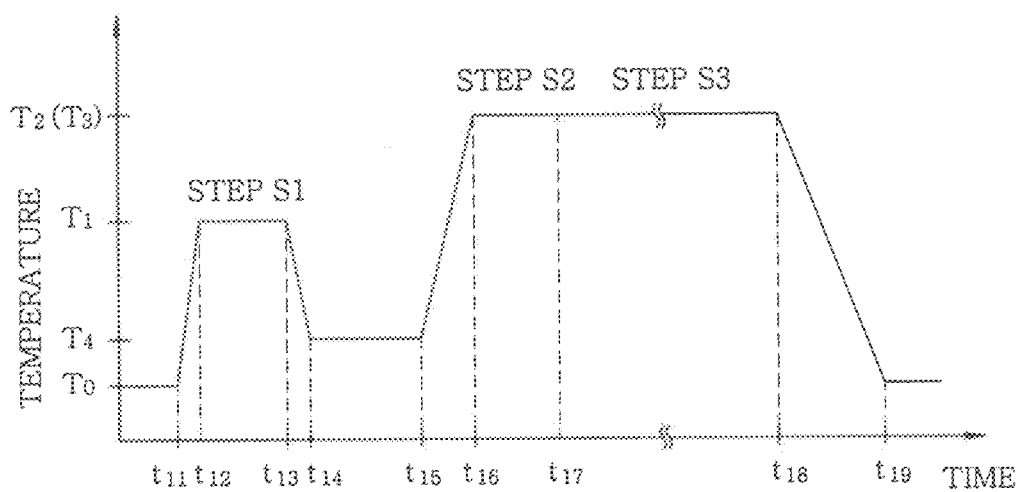
FIG. 7 is a graph showing another example of temperature variation in a wafer when a carbon nanotube is formed thereon.

FIG. 7 shows an example of temperature change in the wafer W in accordance with the second method. First, the wafer W having an initial temperature $T_0$ is mounted onto, e.g., the stage 3A in the process module 100A at a time point $t_{11}$. The output of the heater power supply 29 for the heater 27 has been adjusted in such a way that the wafer W mounted onto the stage 3A is heated to the temperature $T_1$. During a time period from the time point $t_{11}$ to a time point $t_{12}$, the wafer W is heated from the initial temperature $T_0$ to the temperature $T_1$ required for the oxygen plasma treatment of step S1. Then, the oxygen plasma treatment is carried out at the temperature $T_1$ during a time period from the time point $t_{12}$ to a time point $t_{13}$.

When the oxygen plasma treatment of step S1 is ended, the wafer W is unloaded from the process module 100A and transferred to the load-lock chamber 205a or 205b to be mounted onto the stage 206a or 206b. In the process module 100A from which the wafer W has been unloaded, the temperature of the stage 3A is raised by increasing the output of the heater power supply for the heater 27 such that the wafer W mounted on the stage 3A can be heated to the temperature $T_2$.

While the wafer W is unloaded from the process module 100A and is then temporarily accommodated into the load-lock chamber 205a or 205b to be put in a standby state, the temperature of the wafer W is decreased to a temperature $T_4$ during a time period from the time point $t_{13}$ to a time point $t_{14}$ and is then maintained to the same temperature during a time period from the time point $t_{14}$ to a time point $t_{15}$. The temperature $T_4$ may be about 100° C. Further, during a time period from the time point $t_{14}$ to the time point $t_{15}$, no special temperature maintaining process may be carried out and, thus, it is not imperative to maintain the temperature of the wafer W to the temperature $T_4$.

Next, when the temperature of the stage 3A in the process module 100A is sufficiently increased, the wafer W is returned from the load-lock chamber 205a or 205b to the stage 3A. The wafer W mounted on the stage 3A is rapidly heated to the temperature $T_2$ during a time period from the time point $t_{15}$ to a time point $t_{16}$. The temperature rising rate of the wafer W during a time period from the time point $t_{15}$ to the time point $t_{16}$ is required to be at least 100° C./min or more. Further, it is preferable to shorten the period of time between the time point $t_{15}$ and the time point $t_{16}$.

Then, the hydrogen plasma treatment of step S2 is carried out at the temperature $T_2$ during a time period from the time point $t_{16}$ to a time point $t_{17}$. When the hydrogen plasma treatment is ended, the formation of the carbon nanotube 309 of step S3 is continuously carried out during a time period from the time point $t_{17}$ to a time point $t_{18}$ while the temperature of the wafer W is maintained at the temperature $T_2$ (in this case, it is identical to a temperature $T_3$). Alternatively, the carbon nanotube 309 may be formed at a temperature that is different from the temperature $T_2$. That is, the temperature $T_2$ may be different from the temperature $T_3$.

When the formation of the carbon nanotube 309 is ended, the wafer W is unloaded from the process module 100B by using the transfer unit 209 and is then transferred into one of the load ports LP through the load-lock chamber 205a or 205b by using transfer unit 217. Thereafter, the temperature of the wafer W is decreased to the initial temperature $T_0$ during a time period from the time point $t_{18}$ and a time point $t_{19}$.

As such, by phasing the temperature change in the wafer W from the temperature $T_1$ to the temperature $T_2$, it is possible to clearly perform temperature management between the oxygen plasma treatment of step S1 and the hydrogen plasma treatment of step S2. Accordingly, it is possible to adequately perform the conversion of the catalytic metal layer 307 into fine particles in step S1 and effectively reduce the particle surfaces and maintain them in a high activated state without generating excessive aggregation of the thus-produced catalytic fine metal particles 307A.

In the present embodiment, by maintaining a difference between the processing temperature of step S1 and that of step S2, it is possible to both maximize the effects of combining and performing the oxygen and the hydrogen plasma treatment, and form the high-density carbon nanotube 309 oriented substantially perpendicularly with regard to the surface of the wafer (underlying layer 305) on the activated catalytic fine metal particles 307B which have been activated in high density.

The first and the second method are merely examples, and the present invention is not limited thereto. As long as the temperature change in the wafer W can be phased from the temperature $T_1$ to the temperature $T_2$, an apparatus including a different configuration may be employed, and temperature history can also be variously modified.

As will be described later, the carbon nanotube manufactured by using the method of the present embodiment may be employed for, e.g., a via wiring and the like of semiconductor device, an electron emitting element, a carbon nanotube lighting apparatus and the like.

Next, the present embodiment will be described in more detail by using test examples. The present invention is not limited thereto.

Test Example 1

As shown in FIG. 5A, a wafer was provided. The wafer included a silicon substrate 301; underlying layers 303 and 305 formed on the silicon substrate 301; and a catalytic metal layer 307 formed thereon. The underlying layers 303 and 305 were respectively formed of TaN and TiN to have thicknesses of 10 and 5 nm. The catalytic metal layer 307 was formed of Co to have a thickness of 2 nm. The wafer was loaded into a processing chamber of a film forming apparatus having the same configuration as the film forming apparatus 100 shown in FIG. 1. Then, under the following conditions, the oxygen plasma treatment and the hydrogen plasma treatment were performed and the carbon nanotube was grown by using the thermal CVD. Further, the temperature change in the wafer W was phased from the temperature $T_1$ to the temperature $T_2$ to include a temperature rising process at a temperature rising rate of 240° C./min or more by allowing the wafer to stand by in a load-lock chamber of the film forming apparatus between the oxygen and the hydrogen plasma treatment.

Figure 8:
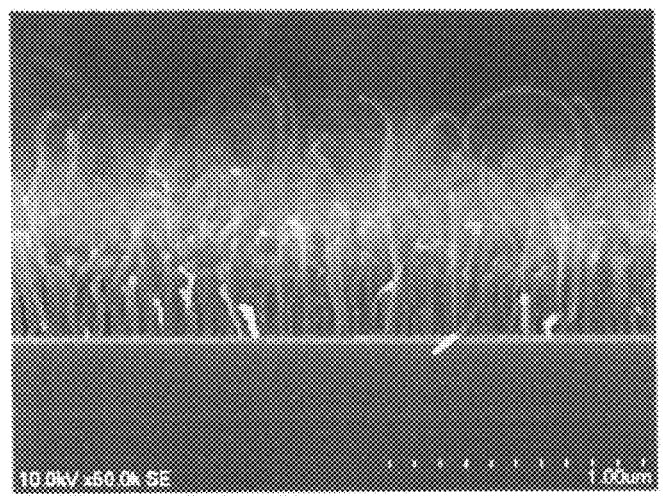
FIG. 8 is a SEM (scanning electron microscope) picture of a cross section of a substrate showing a result of a test in which a carbon nanotube is formed in accordance with a test example 1.

(Conditions of Oxygen Plasma Treatment)
Processing temperature: 300° C. (stage setting temperature: 400° C.)
Processing pressure: 267 Pa (2 Torr)
Processing gas:
$O_2$ gas: 200 mL/min (sccm)
Ar gas: 450 mL/min (sccm)
Power of microwave: 2.8 kW
Processing time: 10 minutes
(Standby Conditions in Load-Lock Chamber)
Standby time: about 30 minutes
Standby temperature: 100° C. (stable)
(Conditions of Hydrogen Plasma Treatment)
Processing temperature: 470° C. (stage setting temperature: 650° C.)
Processing pressure: 66.7 Pa (0.5 Torr)
Processing gas:
$H_2$ gas: 462 mL/min (sccm)
Ar gas: 450 mL/min (sccm)
Power of microwave: 2.8 kW
Processing time: 5 minutes
(Conditions of Formation of Carbon Nanotube)
Processing temperature: 470° C. (stage setting temperature: 650° C.)
Processing pressure: 400 Pa (3 Torr)
Processing gas
$C_2H_4$ gas: 30 mL/min (sccm)
$N_2$ gas: 200 mL/min (sccm)
Ar gas: 450 mL/min (sccm)
Processing time: 60 minutes FIG. 8 is a SEM (scanning electron microscope) picture showing a result of a test in which a carbon nanotube was formed. From FIG. 8, it is confirmed that the carbon nanotube was oriented substantially perpendicularly and formed in high density.

Further, the obtained carbon nanotube was analyzed by using Raman scattering spectroscopy. As a result, a signal of graphene structure showing growth of the carbon nanotube has been seen at a portion of 1585 $cm^{-1}$. Moreover, at a portion of 1350 $cm^{-1}$, a signal of the carbon nanotube or amorphous carbon included in the substitute has been seen. A G/D ratio, i.e., an intensity ratio of G-band (1585 $cm^{-1}$) and D band (1350 $cm^{-1}$) has been found to be higher by about 13% than that in the case that the carbon nanotube was grown at the same substrate temperature by using the microwave plasma CVD. From this, it is confirmed that, by employing the thermal CVD using no plasma, it is possible to form the carbon nanotube having less impurities and an adequate crystalline orientation and reduce the defects in the carbon nanotube.

Comparison Example 1

Figure 9:
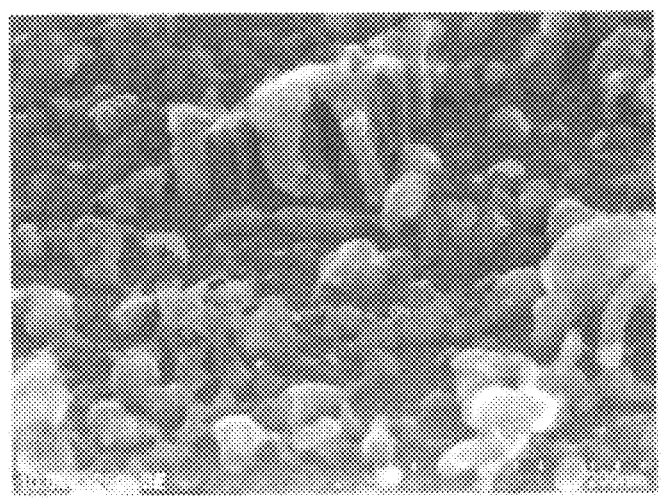
FIG. 9 is a SEM picture of a cross section of a substrate showing a result of a test in which a carbon nanotube is formed in accordance with a comparison example 1.

The carbon nanotube was formed in the same conditions as those in the test example 1 except that the oxygen plasma treatment was not carried out. This result is shown in FIG. 9. In FIG. 9, the agglomeration of the catalytic fine metal particles is found to be excessively proceeded and a lump considered as the graphene is observed, but no growth of the carbon nanotube is seen.

Comparison Example 2

Figure 10:
FIG. 10 is a SEM picture of a cross section of a substrate showing a result of a test in which a carbon nanotube is formed in accordance with a comparison example 2.

The carbon nanotube was formed in the same conditions as those in the test example 1 except that a hydrogen annealing treatment introducing no microwave was carried out instead of the hydrogen plasma treatment. This result is shown in FIG. 10. From FIG. 10, it is found out that the carbon nanotube having shorter length was formed in low density. This may be because the agglomeration of the catalytic fine metal particles was excessively proceeded and the reduction was insufficiently carried out.

Comparison Example 3

The carbon nanotube was formed in the same conditions as those in the test example 1 except the following conditions. Both of the oxygen plasma treatment and the hydrogen plasma treatment were continuously carried out at the processing temperature of 350° C. (stage setting temperature: 450° C.) during 10 minutes each (20 minutes in total) and, then, the wafer was transferred to the load-lock chamber and stood by therein. Then, the wafer was returned to the stage of the film forming apparatus and subjected to the formation of the carbon nanotube.

Figure 11:
FIG. 11 is a SEM picture of a cross section of a substrate showing a result of a test in which a carbon nanotube is formed in accordance with a comparison example 3.

This result is shown in FIG. 11. From FIG. 11, Co nano particles having the diameters in the range between 10 and 20 nm are found to be formed in high density and no excessive agglomeration of the catalytic fine metal particles has been found to be proceeded, but the carbon nanotube was hardly formed. This may be because the activation of the catalytic fine metal particles was insufficiently performed since the oxygen and the hydrogen plasma treatment were carried out at the same temperature, and the surfaces of the catalytic fine metal particles became inactivated since the wafer having the activated catalytic fine metal particles was left in the load-lock chamber.

Reference Example 1-1, 1-2 and 1-3

(Processing Time of Hydrogen Plasma Treatment)

Figure 12:
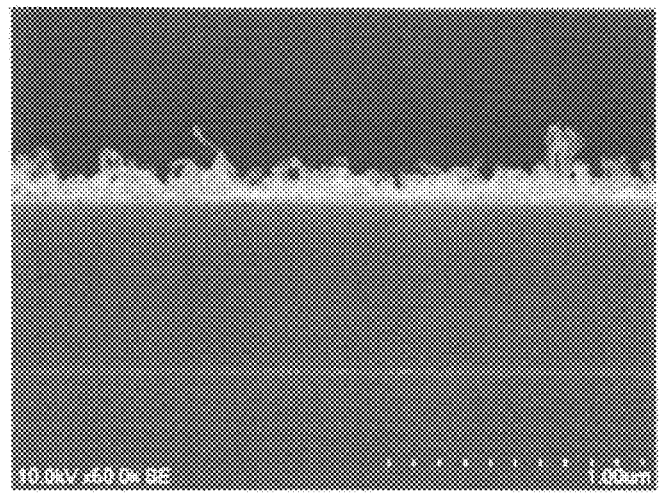
FIG. 12 is a SEM picture of a cross section of a substrate showing a result of a test (processing time of hydrogen plasma: 3 minutes) in which a carbon nanotube is formed in accordance with a reference example 1-1.
Figure 13:
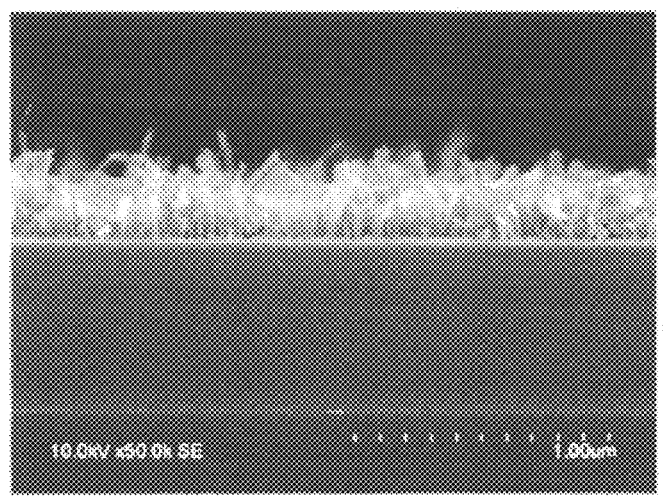
FIG. 13 is a SEM picture of a cross section of a substrate showing a result of a test (processing time of hydrogen plasma: 10 minutes) in which a carbon nanotube is formed in accordance with a reference example 1-2.
Figure 14:
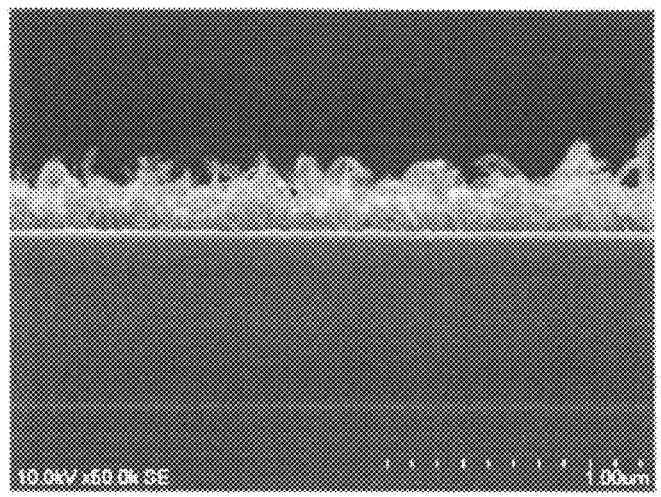
FIG. 14 is a SEM picture of a cross section of a substrate showing a result of a test (processing time of hydrogen plasma: 15 minutes) in which a carbon nanotube is formed in accordance with a reference example 1-3.

The carbon nanotube was formed in the same conditions as those in the test example 1 except that the hydrogen plasma treatment was carried out for 3, 10 and 15 minutes instead of 5 minutes. Results in the case of 3, 10 and 15 minutes are respectively shown in FIGS. 12, 13 and 15. From FIG. 8 (test example 1) and FIGS. 12 to 14, the sufficient carbon nanotubes are found to be formed in the case of the processing time of 5 or 10 minutes for the hydrogen plasma treatment. However, it is found out that the carbon nanotube was hardly grown in the case of the processing time of 3 minutes as compared with 5 or 10 minutes. In the case of 15 minutes, the carbon nanotube was grown to the uppermost limit. This may be because the catalytic fine metal particles were insufficiently activated in the case of the processing time of 3 minutes for the hydrogen plasma treatment, and the agglomeration of the catalytic fine metal particles was proceeded in the case of 15 minutes.

Reference Example 2-1, 2-2 and 2-3

(Microwave Power and Processing Temperature in Oxygen Plasma Treatment)

The carbon nanotube was formed in the same conditions as those in the test example 1 except that the processing temperature and the microwave power of the oxygen plasma treatment were changed as the following conditions. Results in the case of the following conditions (a) to (C) are respectively shown in FIGS. 15 to 17.

(a) Processing temperature: 350° C. (stage setting temperature: 450° C.)

Power of microwave: 2.0 kW (b) Processing temperature: 300° C. (stage setting temperature: 400° C.)

Power of microwave: 2.0 kW (c) Processing temperature: 350° C. (stage setting temperature: 450° C.)

Power of microwave: 2.8 kW

Figure 15:
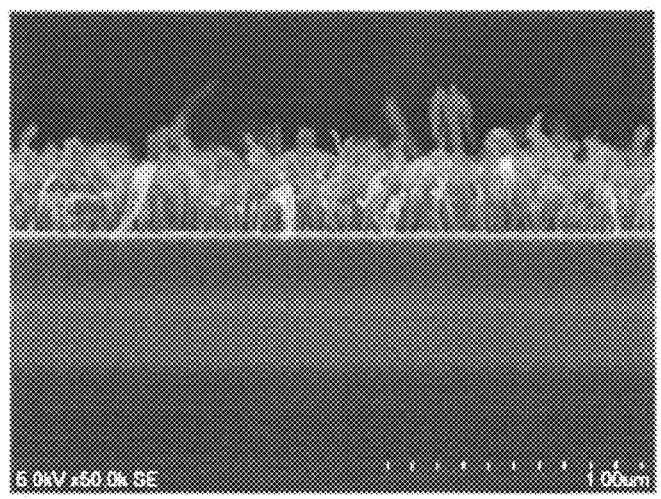
FIG. 15 is a SEM picture of a cross section of a substrate showing a result of a test (processing condition (a) of oxygen plasma) in which a carbon nanotube is formed in accordance with a reference example 2-1.
Figure 16:
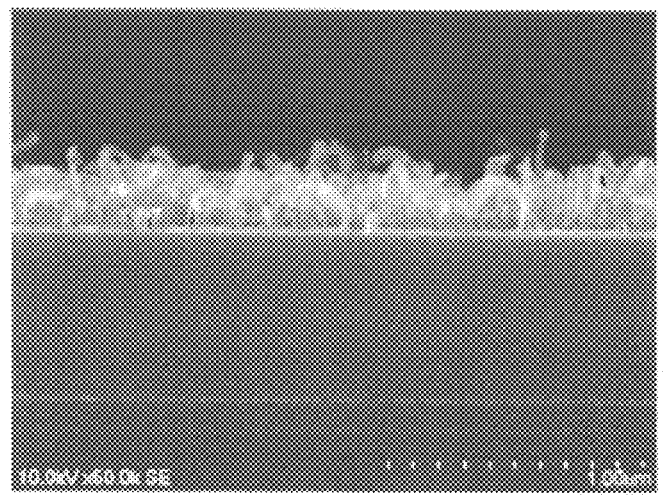
FIG. 16 is a SEM picture of a cross section of a substrate showing a result of a test (processing condition (b) of oxygen plasma) in which a carbon nanotube is formed in accordance with a reference example 2-2.
Figure 17:
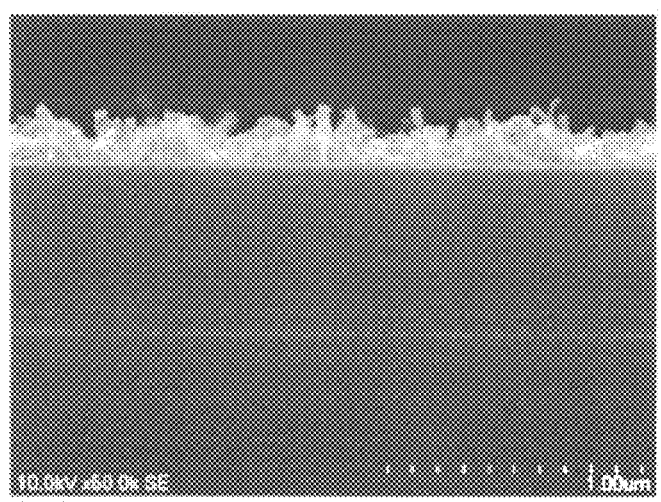
FIG. 17 is a SEM picture of a cross section of a substrate showing a result of a test (processing condition (c) of oxygen plasma) in which a carbon nanotube is formed in accordance with a reference example 2-3.

When the processing temperature was set to 350° C., the carbon nanotubes were sufficiently grown in both cases of the microwave power of 2 kW (condition (a) and FIG. 15) and 2.8 kW (condition (c) and FIG. 17). However, when the processing temperature was set to 300° C., the carbon nanotube was sufficiently grown in the case of the microwave power of 2.8 kW (test example 1 and FIG. 8). On the other hand, in the case of 2.0 kW (condition (b) and FIG. 16), the thickness of the carbon nanotube became thicker and the length of the carbon nanotube became shorter. As such, it can be confirmed that when the processing temperature of the oxygen plasma treatment is decreased, it is possible to sufficiently grow the carbon nanotube by increasing the microwave power.

From the above test results, by using the film forming apparatus 100 capable of generating a microwave plasma, the oxygen plasma treatment and the hydrogen plasma treatment (activation treatment) are carried out on the wafer in which the catalytic metal layers have been formed respectively at the temperature $T_1$ and the temperature $T_2$ that is higher than the temperature $T_1$ and, then, the carbon nanotube is formed by the thermal CVD. In this way, it is possible to form the substantially perpendicularly oriented carbon nanotube. Especially, by using the thermal CVD for forming the carbon nanotube, it is possible to inflict no damage to electrons and ions in the carbon nanotube to thereby prevent crystal defects and infiltration of impurities, and form the carbon nanotube having less impurities and an adequate crystalline orientation.

While the invention has been shown and described with respect to the embodiments, it will be understood by those skilled in the art that various changes and modifications may be made without departing from the scope of the invention as defined in the following claims. For example, in the above embodiment, the oxygen and the hydrogen plasma treatment are carried out in the RLSA microwave plasma processing apparatus. However, another type of microwave plasma may be used. Further, the present invention may employ another type of plasma, e.g., an inductively coupled plasma, a capacitively coupled plasma or the like without being limited to the microwave plasma.

What is claimed is:

1. A carbon nanotube forming method, comprising:
providing a target substrate to be processed, wherein a catalytic metal layer is formed on a surface of the target substrate;
producing catalytic fine metal particles whose surfaces are oxidized by action of an oxygen plasma on the catalytic metal layer at a temperature $T_1$;
activating the oxidized surfaces of the catalytic fine metal particles by reducing the oxidized surfaces of the catalytic fine metal particles by action of a hydrogen plasma on the catalytic fine metal particles at a temperature $T_2$ higher than the temperature $T_1$; and
growing a carbon nanotube on the activated catalytic fine metal particles by thermal CVD at a temperature $T_3$.

2. The method of claim 1, wherein
the temperature $T_1$ and the temperature $T_2$ are respectively set to be in ranges between 100° C. and 450° C. and between 100° C. and 550° C.

3. The method of claim 2, wherein
a difference $(T_2-T_1)$ between the temperature $T_2$ and the temperature $T_1$ is set to be 50° C. or higher.

4. The method of claim 1, further comprising:
changing a temperature from the temperature $T_1$ to the temperature $T_2$ during a heating period of time having a temperature rising rate of at least 100° C./min or more.

5. The method of claim 1, wherein
the activating and the growing are continuously carried out in a same processing chamber.

6. The method of claim 1, wherein
the temperature $T_3$ at which the growing is carried out is set to be in a range between 300° C. and 550° C.

7. A pre-treatment method to be carried out before a carbon nanotube is grown on catalytic fine metal particles formed on a target substrate to be processed, the method comprising:
providing the target substrate to be processed, wherein a catalytic metal layer is formed on a surface of the target substrate;
producing catalytic fine metal particles whose surfaces are oxidized by action of an oxygen plasma on the catalytic metal layer at a temperature $T_1$; and activating the oxidized surfaces of the catalytic fine metal particles by reducing the oxidized surfaces of the catalytic fine metal particles by action of a hydrogen plasma on the catalytic fine metal particles at a temperature $T_2$ higher than the temperature $T_1$.

8. The method of claim 7, wherein
the temperature $T_1$ and the temperature $T_2$ are respectively set to be in ranges between 100° C. and 450° C. and between 100° C. and 550° C.

9. The method of claim 8, wherein
a difference $(T_2-T_1)$ between the temperature $T_2$ and the temperature $T_1$ is set to be 50° C. or higher.

10. The method of claim 7, further comprising:
changing a temperature from the temperature $T_1$ to the temperature $T_2$ during a heating period of time having a temperature rising rate of at least 100° C./min or more.

11. The method of claim 8, further comprising:
changing a temperature from the temperature $T_1$ to the temperature $T_2$ during a heating period of time having a temperature rising rate of at least 100° C./min or more.

12. The method of claim 9, further comprising:
changing a temperature from the temperature $T_1$ to the temperature $T_2$ during a heating period of time having a temperature rising rate of at least 100° C./min or more.

13. The method of claim 1, wherein said producing the catalytic fine metal particles includes removing impurities attached on a surface of the catalytic metal layer by using the oxygen plasma so that migration of catalytic metal atoms occurs on the surface of the catalytic metal layer.

14. The method of claim 1, wherein said producing the catalytic fine metal particles includes generating the oxygen plasma by using a microwave plasma processing apparatus.

15. The method of claim 1, wherein said activating the oxidized surfaces includes generating the hydrogen plasma by using a microwave plasma processing apparatus.

16. The method of claim 1, wherein said growing the carbon nanotube is carried out in a processing chamber with a processing pressure ranging from 66.7 Pa to 667 Pa.

17. The method of claim 16, wherein the processing pressure ranges from 400 Pa to 667 Pa.

18. The method of claim 16, wherein said growing the carbon nanotube includes introducing a hydrocarbon gas, a rare gas, and an $N_2$ gas into the processing chamber.

19. The method of claim 16, wherein said growing the carbon nanotube includes introducing a hydrocarbon gas and one of a reducing gas and an oxidizing gas into the processing chamber.

20. The method of claim 1, wherein said producing the catalytic fine metal particles, said activating the oxidized surfaces, and said growing the carbon nanotube are performed in a same processing chamber, and
wherein the method further comprises, between said producing the catalytic fine metal particles and said activating the oxidized surfaces, and again between said activating the oxidized surfaces and said growing the carbon nanotube:
exhausting the processing chamber; and
purging the processing chamber by supplying an Ar gas or an $N_2$ gas into the processing chamber.

21. The method of claim 7, wherein said producing the catalytic fine metal particles includes removing impurities attached on a surface of the catalytic metal layer by using the oxygen plasma so that migration of catalytic metal atoms occurs on the surface of the catalytic metal layer.

22. The method of claim 7, wherein said producing the catalytic fine metal particles includes generating the oxygen plasma by using a microwave plasma processing apparatus.

23. The method of claim 7, wherein said activating the oxidized surfaces includes generating the hydrogen plasma by using a microwave plasma processing apparatus.

24. The method of claim 7, wherein said producing the catalytic fine metal particles and said activating the oxidized surfaces are performed in a same processing chamber, and
wherein the method further comprises, between said producing the catalytic fine metal particles and said activating the oxidized surfaces:
exhausting the processing chamber; and
purging the processing chamber by supplying an Ar gas or an $N_2$ gas into the processing chamber.

* * * * *